United States Patent [19]

Grassl et al.

[11] Patent Number: 4,794,242

[45] Date of Patent: Dec. 27, 1988

[54] CHIP CARD READER

[75] Inventors: Erwin Grassl; Hermann Hansbauer, both of Munich, Fed. Rep. of Germany

[73] Assignee: Siemens Aktiengesellschaft, Berlin and Munich, Fed. Rep. of Germany

[21] Appl. No.: 125,634

[22] Filed: Nov. 25, 1987

Related U.S. Application Data

[63] Continuation-in-part of Ser. No. 788,271, Oct. 17, 1985, Pat. No. 4,717,817.

[30] Foreign Application Priority Data

Nov. 28, 1986 [DE] Fed. Rep. of Germany ... 8631861[U]

[51] Int. Cl.⁴ ............................................. G06K 13/00
[52] U.S. Cl. .................................................... 235/482
[58] Field of Search .......................................... 235/482

[56] References Cited

U.S. PATENT DOCUMENTS 3,976,858 8/1976 Haun .................................. 235/482

Primary Examiner—Harold I. Pitts
Attorney, Agent, or Firm—Mark H. Jay

[57] ABSTRACT

A chip card reader has a fixed frame in which a movable carriage is mounted. The carriage supports contact means for reading the semiconductor chip in a chip card. The electrical connection between the contact means and the rest of the electrical circuitry is established by a ribbon conductor which is formed in a fanfold configuration. This reduces the likelihood of breakage and increases the service life of the chip card reader.

1 Claim, 1 Drawing Sheet

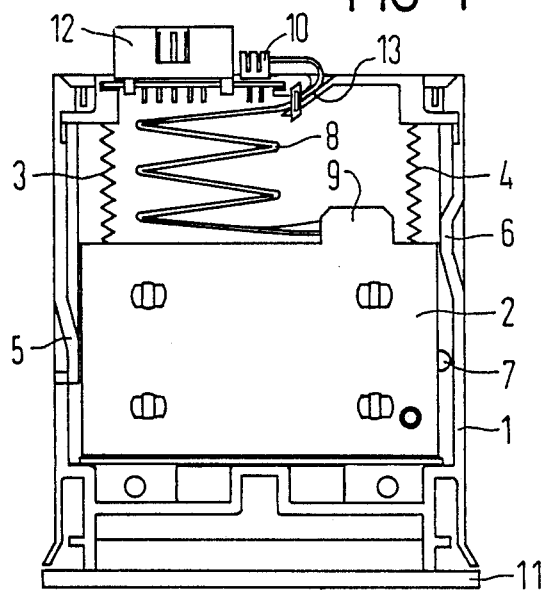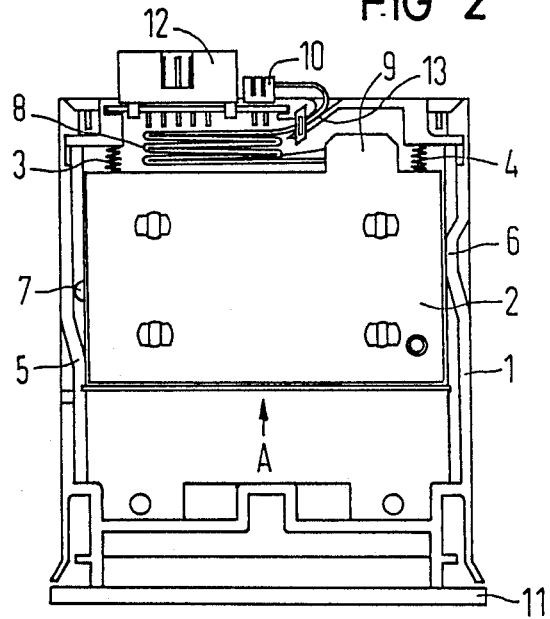

CHIP CARD READER

CROSS-REFERENCE TO RELATED APPLICATION

This application is a continuation-in-part of commonly-owned pending application Ser. No. 788,271, filed Oct. 17, 1985.

BACKGROUND OF THE INVENTION

The present invention relates to a chip card reader, i.e. a device for reading cards on which information is stored in a semiconductor chip which is mounted to the card. More particularly, the invention relates to chip card readers which utilize a moveable spring-loaded carriage in which the card is received.

In card readers of this type, the chip card is introduced into the carriage through an opening. Through pressure on the movable carriage against opposing spring pressure, the card reaches the read position at which it is held, for example, by a cam. After the card has been read, it is pushed back by the carriage. To read the card, a carriage mounted contact means is used and connected to the rest of the necessary circuitry by a multi-lead ribbon conductor.

After frequent use of the reader this ribbon conductor fails due to high buckling and bending loads. This disables the chip card reader.

SUMMARY OF THE INVENTION

One object of the invention is to provide a chip card reader in which the ribbon conductor has a longer service life.

Another object is, in general, to improve on known chip card readers of this type.

In accordance with the invention, the ribbon conductor is formed in a fanfold configuration.

Through this formation, the buckling loads which are caused by actuation of the carriage, particularly at the ends of the conductor, can be substantially reduced. Because of the multifold configuration, the ends of the conductor may be terminated at only small angles, so that only small buckling motions can occur.

BRIEF DESCRIPTION OF THE DRAWINGS

Exemplary and non-limiting preferred embodiments of the invention are shown in the drawings, in which:

FIG. 1 shows a top view of the chip card reader in the normal position; and

FIG. 2 shows a top view of the chip card reader in the read position.

DETAILED DESCRIPTION OF PREFERRED EMBODIMENTS

The preferred embodiment has a fixed frame generally indicated by reference numeral 1 and a movable carriage generally indicated by reference numeral 2 which is supported by the frame 1.

When a chip card (not shown) is introduced through an opening 11 in the frame 1, it is received by the carriage 2. The carriage 2 is then moved into the read position (FIG. 2), against the bias of the compression springs 3 and 4 which extend between the frame 1 and carriage 2. The carriage 2 is then held in the read position by an appropriate mechanism such as a card-controlled cam (not shown). After the card has been read, it is pressed inwardly in the direction of arrow A. This releases the carriage 2 and the carriage 2 is then moved to its original position by the springs 3 and 4.

The carriage 2 contains appropriate contact means such as springs (not shown) through which electrical contact with the chip on the chip card may be established. This contact means (not shown) is actuated by drive surfaces 5 and 6 (which are mounted to the frame 1) and a slider 7 (which is movably attached to the carriage 2).

To establish the necessary electrical connection between the contact means and the remaining electronic apparatus (not shown), there is provided a multi-lead ribbon conductor 8, which is terminated at its ends by terminal 9 (fixed to the carriage 2) and terminal 10 (fixed to the frame 1).

The ribbon conductor 8 is formed in a fanfold configuration. The fixed end of the ribbon conductor 8 is held in place by a flange 13 and routed out of the center of the frame 1 through a slot. The terminal 10 is connected to a multipole connector which is designated with reference numeral 12.

As is evident from a comparison of FIG. 1 and FIG. 2, the fanfold configuration of the ribbon conductor 8 reduces the amount of flexure at the ends of the ribbon conductor 8 and also at each of the fanfold segments. This reduces the likelihood of breakage at these points and thereby increases service life of the chip card reader.

Those skilled in the art will understand that changes can be made in the preferred embodiments here described, and that these embodiments can be used for other purposes. Such changes and uses are within the scope of the invention, which is limited only by the claims which follow.

What is claimed is:

1. A chip card reader, comprising:
   a movable carriage shaped to receive a chip card and including means for establishing electrical contact with a chip mounted on said card;
   a fixed frame supporting the carriage for sliding movement within the frame; and
   a multi-lead ribbon conductor which is formed into a fanfold configuration and has one end fixed to the carriage and another end fixed to the frame.

* * * * *